(12) United States Patent
Chhabra et al.

(10) Patent No.: US 11,042,652 B2
(45) Date of Patent: *Jun. 22, 2021

(54) TECHNIQUES FOR MULTI-DOMAIN MEMORY ENCRYPTION

(71) Applicant: INTEL CORPORATION, Santa Clara, CA (US)

(72) Inventors: Siddhartha Chhabra, Portland, OR (US); David M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/558,705

(22) Filed: Sep. 3, 2019

(65) Prior Publication Data

US 2020/0004696 A1 Jan. 2, 2020

Related U.S. Application Data

(63) Continuation of application No. 15/396,157, filed on Dec. 30, 2016, now Pat. No. 10,402,574.

(51) Int. Cl.
| | |
|---|---|
| *G06F 21/60* | (2013.01) |
| *G06F 21/57* | (2013.01) |
| *H04L 9/08* | (2006.01) |
| *H04L 9/32* | (2006.01) |
| *G06F 12/14* | (2006.01) |

(52) U.S. Cl.
CPC .......... *G06F 21/602* (2013.01); *G06F 21/57* (2013.01); *H04L 9/0897* (2013.01); *H04L 9/3242* (2013.01); *G06F 12/1408* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 9,367,697 | B1* | 6/2016 | Roth | G06F 21/602 |
| 10,402,574 | B2* | 9/2019 | Chhabra | G06F 21/57 |
| 2011/0258438 | A1* | 10/2011 | Hildebrand | H04L 63/04 |
| | | | | 713/165 |
| 2015/0370727 | A1* | 12/2015 | Hashimoto | G06F 12/145 |
| | | | | 711/163 |
| 2016/0012653 | A1* | 1/2016 | Soroko | G07C 5/0808 |
| | | | | 340/5.61 |

* cited by examiner

*Primary Examiner* — Benjamin E Lanier
(74) *Attorney, Agent, or Firm* — Kacvinsky Daisak Bluni PLLC

(57) ABSTRACT

Various embodiments are generally directed to techniques for multi-domain memory encryption, such as with a plurality of cryptographically isolated domains, for instance. Some embodiments are particularly directed to a multi-domain encryption system that provides one or more of memory encryption, integrity, and replay protection services to a plurality of cryptographic domains. In one embodiment, for example, an apparatus may comprise a memory and logic for an encryption engine, at least a portion of the logic implemented in circuitry coupled to the memory. In various embodiments, the logic may receive a memory operation request associated with a data line of a set of data lines stored in a protected memory separate from the memory.

22 Claims, 9 Drawing Sheets

Storage Medium 700

*Computer Executable Instructions for 400*

*Computer Executable Instructions for 500*

*Computer Executable Instructions for 600*

TECHNIQUES FOR MULTI-DOMAIN MEMORY ENCRYPTION

CROSS-REFERENCE TO RELATED APPLICATION

This application is a continuation of, claims the benefit of and priority to previously filed U.S. patent application Ser. No. 15/396,157 filed Dec. 30, 2016, entitled "TECHNIQUES FOR MULTI-DOMAIN MEMORY ENCRYPTION", which is hereby incorporated by reference in its entirety.

BACKGROUND

Cryptography may refer to the practice and study of techniques for secure communication in the presence of third parties. More generally, cryptography is about constructing and analyzing protocols that prevent third parties from reading private data. In application, cryptography can involve one or more of encryption and decryption. Encryption can be the process of converting ordinary information, referred to as plaintext, into an unintelligible sequence of symbols, referred to as ciphertext, and decryption can be the process of converting ciphertext back to plaintext. Typically, a cipher system may include a pair of algorithms that convert data back and forth between plaintext and ciphertext.

BRIEF DESCRIPTION OF THE DRAWINGS

FIG. 7 illustrates an embodiment of a storage medium.

DETAILED DESCRIPTION

Figure 1:
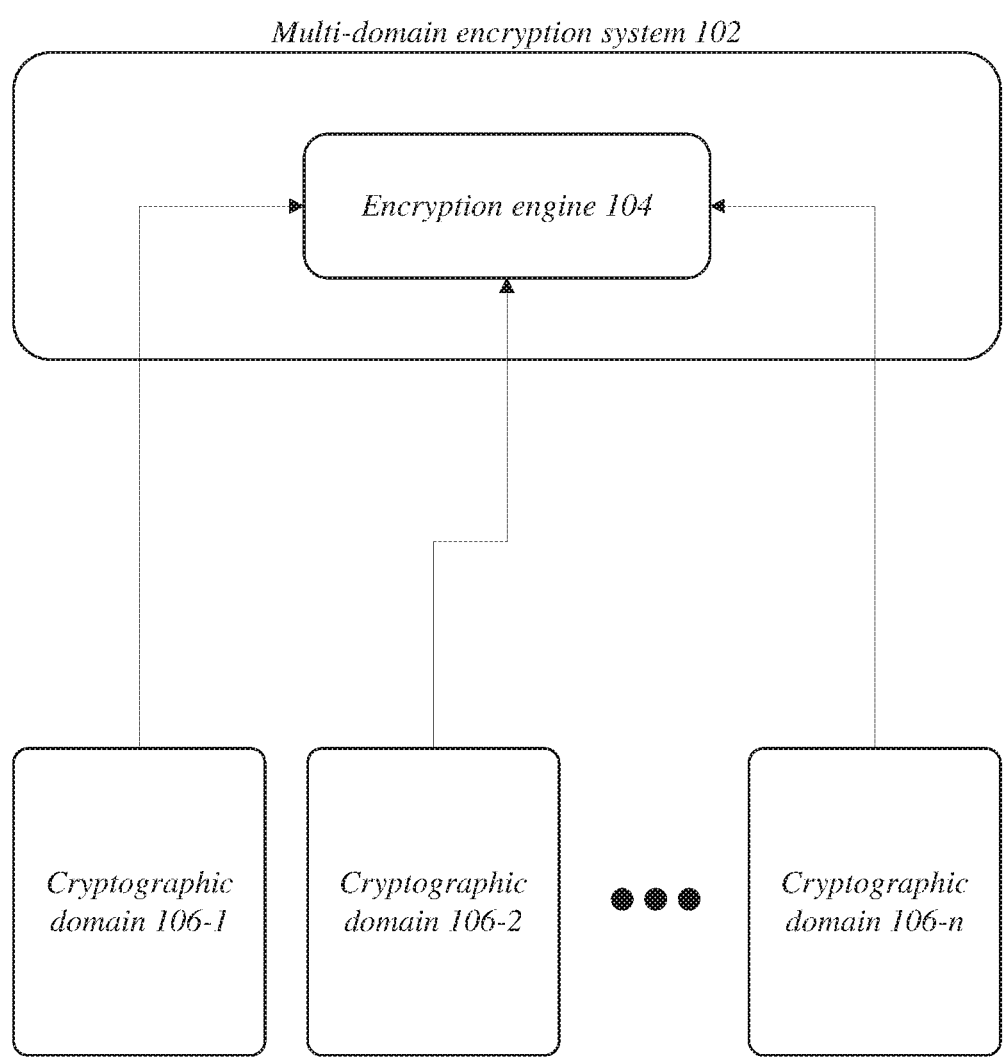
FIG. 1 illustrates an embodiment of a first operating environment.

Various embodiments are generally directed to techniques for multi-domain memory encryption, such as with a plurality of cryptographically isolated domains, for instance. Some embodiments are particularly directed to a multi-domain encryption system that provides one or more of memory encryption, integrity, and replay protection services to a plurality of cryptographic domains. In one embodiment, for example, an apparatus may comprise a memory and logic for an encryption engine, at least a portion of the logic implemented in circuitry coupled to the memory. In various embodiments, the logic may receive a memory operation request associated with a data line of a set of data lines stored in a protected memory separate from the memory. In various such embodiments, the logic may identify a message authentication code (MAC) and a version associated with the memory operation request and use a domain key to verify the MAC and a metadata key to verify the version. In some embodiments, the version and the MAC may be verified based on data stored in the memory, such as in a metadata tree. Other embodiments are described and claimed.

Some challenges facing encryption engines include the inability or use of excessively complex, bulky, and inefficient techniques to implement a plurality of cryptographically isolated domains with memory protections, such as memory encryption, integrity, and replay protection. These challenges may result from various features of the different cryptographic domains. For instance, an encryption engine must be provisioned with one key per cryptographic domain for encryption, one key per cryptographic domain for MAC generation, and another key for integrity and replay protection. Adding further complexity, one or more memories may be encrypted according to different cipher systems. For example, data from one or more of the cryptographic domains may have to be decrypted before it can be used for memory protection purposes. These and other factors may result in encryption engines with poor performance and limited cryptographic domains. Such limitations can drastically reduce the capabilities, usability, and applicability of the encryption engine, contributing to inefficient systems with limited capabilities.

Various embodiments described herein include an encryption engine that includes an encryption engine that uses encryption to defend against passive attacks and integrity/replay protection to defend against active attacks for a plurality of cryptographic domains. In some embodiments, the encryption engine may build a metadata tree over a protected memory to provide integrity and replay protection to the plurality of cryptographic domains. In various embodiments, the encryption engine can use three keys or pairs of keys, one for encryption of data lines, one for generation of MACs, and one for the metadata tree. In various such embodiments, data and MACs associated with the data line may be generated with domain specific keys while any updates to the metadata tree are carried out with a metadata key. In these and other ways the encryption engine may enable quick and efficient memory protections to achieve improved memory security for a plurality of cryptographic domains with increased capabilities and higher efficiencies, resulting in several technical effects and advantages.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an example of an operating environment 100 that may be representative of various embodiments. Operating environment 100 may include multi-domain encryption system 102 and cryptographic domains 106-1, 106-2, 106-n. In operating environment 100, multi-domain encryption system 102 may include encryption engine 104 to provide memory protections, such as encryption, integrity, and replay protection, to any number of components operating within cryptographic domains (i.e., cryptographic domains 106-1, 106-2, 106-n). In some embodiments, each cryptographic domain may be cryptographically isolated. In various embodiments described herein, encryption engine 104 may build a metadata tree over a set of protected data lines to provide integrity and replay protection to cryptographic domains 106-1, 106-2, 106-n. In various such embodiments, encryption engine may use domain specific keys for MAC generation and encryption while using a common metadata key to update the metadata tree for each of the cryptographic domains 106-1, 106-2, 106-n. Embodiments are not limited in this context.

In various embodiments, cryptographic domains 106-1, 106-2, 106-n may provide cryptographically isolated domains, such as for the operation of virtual machines (VMs). In various such embodiments, each virtual machine may be provisioned with an encryption key, or key pair, and a MAC key, or key pair, while a single metadata key, or key pair, is used for metadata associated with providing memory protections to the different cryptographic domains 106-1, 106-2, 106-n. In some embodiments, cryptographic domains 106-1, 106-2, 106-n may each include a trusted execution environment (TEE). For example, a cryptographic domain may include one or more of a VM, a software guard extension (SGX) enclave, a container, or an embedded hardware subsystem.

In some embodiments, encryption engine 104 may provide encryption, integrity, and replay protection services to the plurality of cryptographic domains 106-1, 106-2, 106-n. In various embodiments, encryption engine 104 may provide encryption to data associated with the cryptographic domains 106-1, 106-2, 106-n to protect against passive attacks. In various such embodiments, encryption engine 104 may use counter mode encryption. In some embodiments, cryptographic work required to encrypt/decrypt a data line may be decoupled from the data itself. For example, a seed, or cryptographic pad, may be uniquely associated with each data line. In such examples, the data line may be encrypted/decrypted with an exclusive or (XOR) logical operation between the data line and the cryptographic pad. In various embodiments, encryption may be performed with one or more domain specific keys.

In various embodiments, counter mode encryption may require that the seed be both spatially and temporally unique. In various such embodiments, spatial uniqueness may be achieved by using the address of the data line as a component of the seed and temporal uniqueness may be achieved by associating a per-line counter that is incremented on each write back of the data line to memory. In some embodiments, the per-line counter may act as a version for the data line.

In some embodiments, encryption engine 104 may provide integrity and replay protection services to the plurality of cryptographic domains 106-1, 106-2, 106-n to protect against active attacks. For example, encryption engine 104 may receive a memory operation request associated with a data line of a set of data lines stored in a protected memory. The encryption engine 104 may identify a MAC and a version associated with the memory operation request and verify the MAC with a domain key and the version with a metadata key. In some embodiments, at least a portion of encryption engine 104 may be implemented in circuitry coupled to a memory that is separate from the protected memory. In some such embodiments, one or more of the metadata key and domain keys may be stored in the memory. In various embodiments, encryption engine 104 may use a data structure comprising a plurality of counters and embedded MACs to provide integrity and replay protection services to the plurality of cryptographic domains 106-1, 106-2, 106-n. In various such embodiments, the plurality of counters and embedded MACs may be arranged in a hierarchical manner, such as in a metadata tree. In some embodiments, the plurality of counters and embedded MACs may be stored in the memory.

Figure 2:
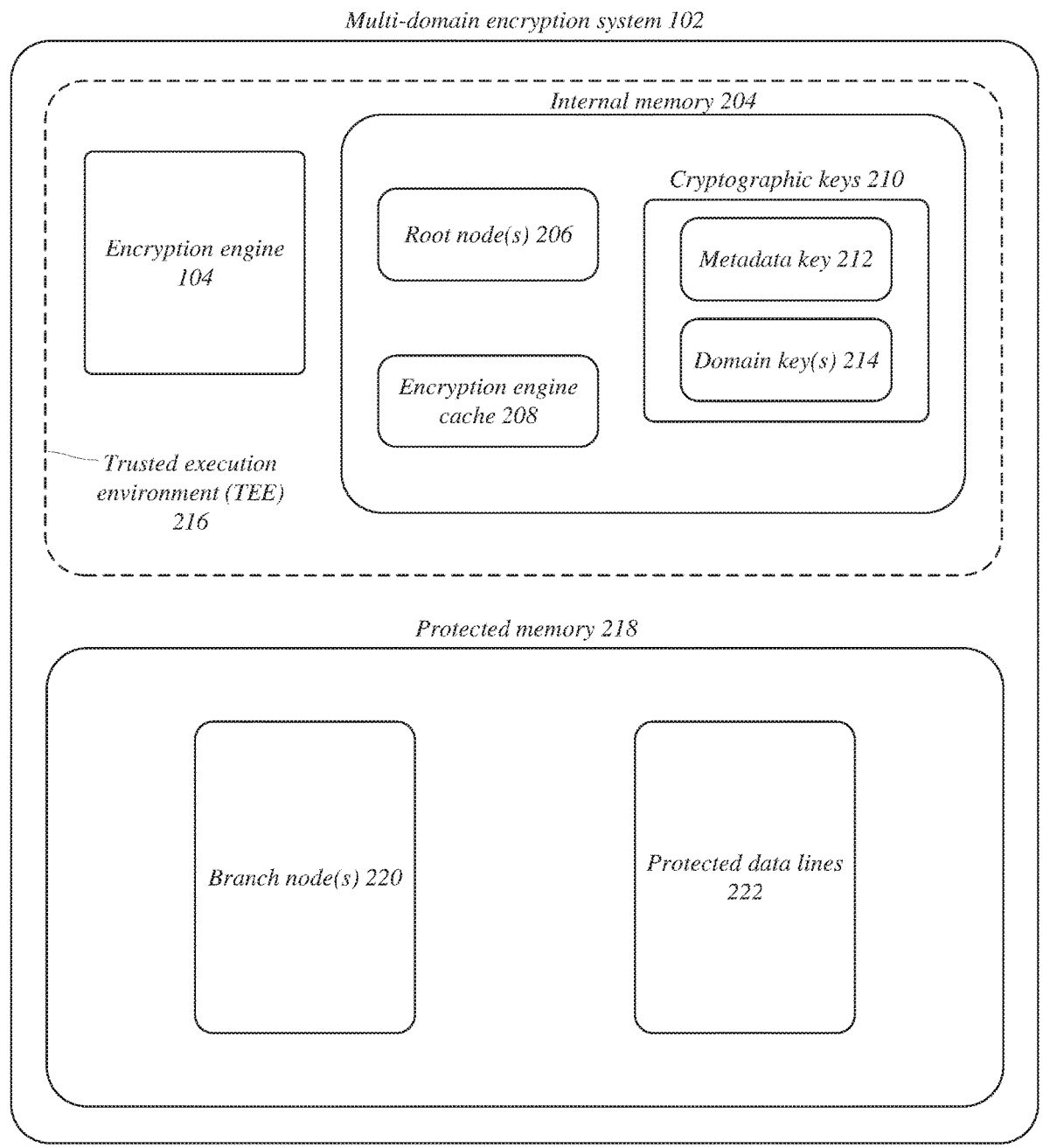
FIG. 2 illustrates an embodiment of a second operating environment.

FIG. 2 illustrates an example of an operating environment 200 that may be representative components in multi-domain encryption system 102. In operating environment 200A, multi-domain encryption system 102 may include encryption engine 104, internal memory 204, and protected memory 218. Encryption engine 104 and internal memory 204 may form one or more portions of trusted execution environment (TEE) 216. In the various embodiments, internal memory 204 can include root nodes 206, encryption engine cache 208, and cryptographic keys 210 comprising metadata key 212 and one or more domain key(s) 214, further protected memory 218 may include branch nodes 220 and protected data lines 222. In various embodiments described herein, encryption engine 104 utilize metadata key 212 for updating branch node(s) 220 and domain key(s) 214 for updating protected data lines 222. In some embodiments, encryption engine 104 may generate one or more metadata trees comprising root node(s) 206 and branch nodes 220 to provide integrity and replay protection to protected data lines 222. In some such embodiments, each branch node 220 may be based off of a root node 106. Embodiments are not limited in this context.

In various embodiments, encryption engine 104 may provision one or more of cryptographic keys to one or more cryptographic domains (e.g., cryptographic domains 106-1, 106-2, 106-n) and/or one or more trusted execution environments (e.g., TEE 216). In some embodiments, each cryptographic domain may be provisioned with a unique encryption key and a unique MAC key. In some such embodiments, encryption/decryption and MAC generation/ verification with data lines associated with a particular cryptographic domain may use the associated or provisioned keys. Thus, an encryption key associated with the particular domain may be used to encrypt/decrypt associated data lines in protected data lines 222, and a MAC key associated with the domain may be used to generate/verify MACs associated with or stored in protected data lines 222. In various embodiments, TEE 216 may be provisioned a metadata key. In various such embodiments, encryption engine 104 may use metadata key 212 to generate and/or update branch node(s) 220.

It will be appreciated that one or more keys described herein may refer to a key pair and one or more of the keys may undergo one or more key expansions to enable cryptographic operations. In one embodiment, for instance, before a key can be used for cryptographic operations, such as encrypting or generating MACs, it must be expanded into a larger number of keys. In some such instances the key may be expanded into 11 keys to support multiple rounds of encryption or decryption. In various embodiments, the key may be expanded on the fly during execution. In other embodiments, the keys may be expanded and stored in internal memory 204 prior to operation. In some embodiments, whether or not keys are expanded on the fly may be decided based on different performance constraints, such as area/performance tradeoffs.

In some embodiments, branch nodes(s) 220 and root node(s) 206 may be collective referred to as tree nodes. In some such embodiments, a set of tree nodes may form a metadata tree. In various embodiments, one or more branch nodes 220 may be loaded into internal memory 204 from protected memory 218, such as in encryption engine cache 208, for their authenticity to be verified as part of a tree walk performed in response to a write operation. In various such embodiments, authenticity of a tree node may need to be verified each time the node is stored to and subsequently retrieved from protected memory 218. In some embodiments, in response to a read operation, a tree walk may also establish the integrity of the data line read.

In various embodiments, each metadata tree may be based in a root node 206. In various such embodiments, the root node 206 may be protected from being moved out of TEE 216, such as being evicted from internal memory 204. In various embodiments, a trusted execution environment (e.g., TEE 216) may provide a secure environment that can provide a protected platform for encryption operations. For example, code and data loaded within TEE 216 may be protected with respect to confidentiality and integrity. In some embodiments, encrypting and decrypting data may only occur within TEE 216, thereby preventing access to unsecure data. In various embodiments, TEE 216 may include one or more of a VM, a software guard extension (SGX) enclave, a container, or an embedded hardware subsystem.

In some embodiments, multi-domain encryption system 102 may include one or more components and/or implement one or more techniques for administration of cryptographic domains 106-1, 106-2, 106-n, such as cryptographic domain creation, tear down, identification, key provisioning, and other administrative, managerial, or support operations. In various embodiments, the cryptographic domains may be created by system software. For example, multi-domain encryption system 102 may include one or more server components that generate cryptographic domains for VMs. In such examples, a virtual machine running a client workload may form a cryptographic domain and resource management software may assign one or more domain keys to the VM. In some embodiments, multi-domain encryption system 102 may be able to change association of memory from one cryptographic domain to another. In various embodiments, a metadata tree that provides integrity and replay protection may be realized by insuring cryptographic domain identity is communicated with each access and associating at least one key with each cryptographic domain.

In various embodiments, cryptographic domain identity communication may utilize one or more bits in the physical address or the address bus may be extended to carry domain identification information. For instance, in some embodiments, physical address bits may be used to identify which key to use when encrypting/decrypting data and computing an associated MAC when the address is used to access memory. In some such embodiments, the physical address bits may include unused address bits due to unpopulated external memory. In various embodiments, an address may include a cryptographic bit (c-bit) and/or one or more key identification (key-ID) bits for cryptographic domain identification purposes. In some embodiments, the c-bit may indicate whether or not encryption is used on data stored at the address. For example, a value of 1 may indicate encryption is used and a value of 0 may indicate no encryption is used. In various embodiments, the c-bit may allow any page in any range to be used as shared memory, making the whole address space addressable. In some embodiments, the c-bit may clearly indicate to software what is definitively shared memory. In various embodiments, the one or more key-ID bits may indicate which key to use to access the memory. For instance, the key-ID may indicate which key of cryptographic keys 210 to use to access the memory at the physical address. In some embodiments, key-IDs may effectively partition memory as they are part of the address space, thereby forming ranges of memory for each key.

In some embodiments, using address bits to indicate which key to use for data in a memory location may also be used to facilitate administration of the cryptographic domains. For example, changing association of memory form one cryptographic domain to another cryptographic domain may be achieved by changing the domain key provisioned to encrypt the data and compute the MAC for the memory. In such examples, a non-temporal move (movnt) or similar in association with an updated domain key specified by the key-ID may be used to cause the memory to be written without first being read, thereby causing the data and associated MACs to be recomputed with the updated domain key.

In various embodiments, one or more of cryptographic keys 210 may be stored outside of internal memory 204, such as in protected memory 218. In various such embodiments, the keys stored outside of internal memory 204 may be themselves encrypted using another key that remains in internal memory 204. For example, a fuse key array, a physical unclonable function (PUF), or a cryptographic derivation thereof may be used to facilitate keys being stored outside of internal memory 204. In some embodiments, this may include wrapping keys before they are stored in memory.

Figure 3:
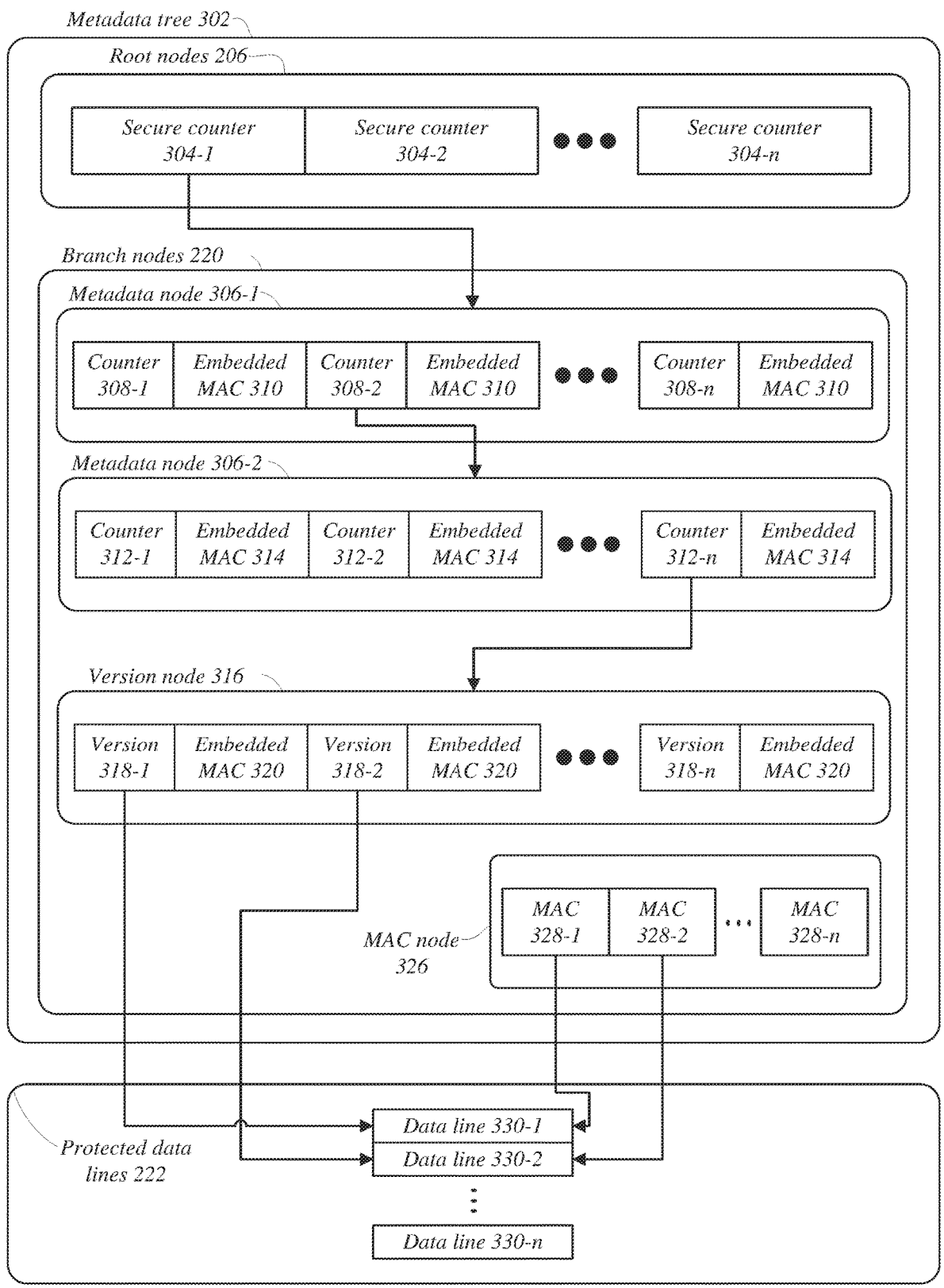
FIG. 3 illustrates an embodiment of a third operating environment.

FIG. 3 illustrates an example of an operating environment 300 that may be representative of a metadata tree 302 utilized by multi-domain encryption system 102 to provide integrity and replay protection. Operating environment 300 may include metadata tree 302 and protected data lines 222. In various embodiments described herein, one or more domain specific key may be used to encrypting/decrypting data lines 330-1, 330-2, 330-n and generating/updating/verifying MAC 328-1, 328-2, 328-n, while one or more metadata keys are used for generating/updating/verifying metadata nodes 306-1, 306-2, and version node 316. In various such embodiments, encryption engine 104 may create one or more metadata trees to provide integrity and replay protection to a plurality of cryptographic domains. Embodiments are not limited in this context.

In various embodiments, metadata tree 302 may provide integrity and replay protection to data protected data lines 222. In the illustrated embodiment, metadata tree 302 may include root nodes 206 and branch nodes 220. Root nodes 206 may include one or more secure counters 304-1, 304-2, 304-n. For example, root nodes 206 may include root counters or top-level counters that are stored securely in internal memory 204. In some embodiments internal memory 204 may include on chip static random access memory (SRAM) that store root nodes 206 such that they are never evicted from internal memory 204, and are thereby guaranteed to be protected from attacks.

In some embodiments, branch nodes 220 may include metadata nodes 306-1, 306-2, version node 316, and MAC node 326. In various embodiments metadata node 306-1 may include counters 308-1, 308-2, 308-n and embedded MAC 310. Similarly, metadata node 306-2 may include counters 312-1, 312-2, 312-n and embedded MAC 314. In some embodiments, version node 316 may include versions 318-1, 318-2, 318-n. In some such embodiments, a version 318 may include a counter that is associated with a specific data line in protected data lines 222 and embedded MAC 320. In various embodiments, versions 318-1, 318-2, 318-n may be updated each time the associated data line is written back to memory (e.g., version 318-1 and data line 330-1). In various embodiments, an embedded MAC may be computed over the counters/versions stored in the node and a counter value from a branch node directly above in metadata tree 302. For example, embedded MAC 320 may be generated based on counter 312-n, versions 318-1, 318-2, 318-n, and metadata key 212.

In various embodiments, counters at each level of the metadata tree 302 may act as versions for the next lower level down to the version node storing the versions for the individual data lines. In various such embodiments, on each write to a data line, all counters (including the version) and associated embedded MACs along the data lines branches may be updated to ensure that the counters along the tree branch reflect the most recent state. In some embodiments, in order to ensure replay protection, each time a data line is loaded from protected data lines 222, it is verified for authenticity against the tree nodes up to the root node. In some such embodiments a mismatch at any level may indicate a potential attack and may result in a security exception being raised, such as to defeat the attack.

In some embodiments, the process of loading tree nodes along a branch and verifying its authenticity may be referred to as a tree walk. In the case of a write, the tree walk may be done to load tree nodes that need to be updated and have their authenticity verified subsequent to being stored in protected memory 218. In the case of a read, the tree walk may also establish the integrity of the data line read. In various embodiments, the tree nodes loaded in the tree walk may be stored in internal memory 204, such as in encryption engine cache 208. In various such embodiments, a tree walk may be terminated when the first node along the tree walk is found in the cache (for writes, the cached tree node should be in a modified state for the walk to be terminated). In some embodiments, a node stored in encryption engine cache 208 may be considered secure because it was verified by a previous request before being cached, and serves the same purpose as the root node being located in internal memory 204.

In various embodiments, MAC node 326 may include a MAC value associated with each protected data line 222. For example, MAC 328-1 may be associated with data line 330-1, MAC 328-2 may be associated with data line 330-2, and MAC 328-n may be associated with data line 330-n. In some embodiments, each time the data line is written back to memory the associated MAC value is updated to reflect the most recent data that is stored in the memory. In various embodiments, MACs 328-1, 328-2, 328-n are generated/updated using domain specific keys (e.g., domain key(s) 214). In various such embodiments, data stored in protected data lines 222 (e.g., data lines 330-1, 330-2, 330-n) may be encrypted using domain specific keys. While the other nodes in metadata tree 302 are generated/updated using metadata key 212.

Figure 4:
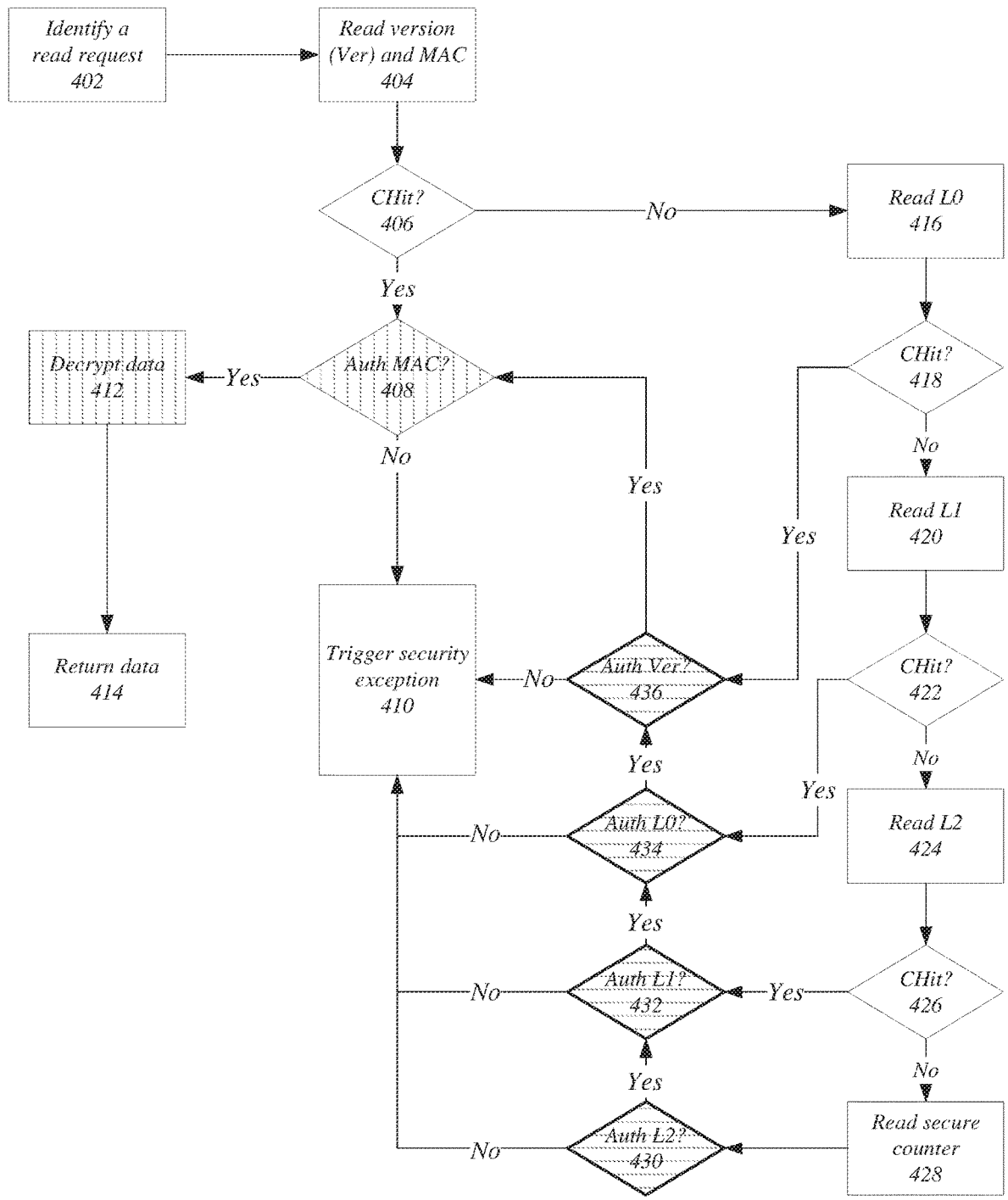
FIG. 4 illustrates an embodiment of a first logic flow.

FIG. 4 illustrates one embodiment of a logic flow 400, which may be representative of operations that may be executed in various embodiments in conjunction with a tree walk for a read request. The logic flow 400 may be representative of some or all of the operations that may be executed by one or more components of operating environments 100, 200A, 300 of FIGS. 1-3, such as multi-domain encryption system 102 or encryption engine 104. In the illustrated embodiment, vertical lines in a block indicate an operation performed using a domain key and horizontal lines in a block indicate an operation performed using a metadata key. The embodiments are not limited in this context.

In the illustrated embodiment shown in FIG. 4, the logic flow 400 may begin at block 402. At block 402 "identify a read request" a memory read request may be identified. For example, the memory read request may identify data line 330-1 to be read into internal memory 204. Continuing to block 404 "read version (Ver) and MAC" the version and the MAC associated with the memory read request may be determined based on the read request. For example, the version may be determined to be 318-1 and the MAC may be determined to be 328-1. At block 406, "Chit?" it may be determined whether or not the version and the MAC are located in a cache memory. For example, internal memory 204 may include one or more cache memories, such as encryption engine cache 208, that are searched for a match to the version and MAC. If the version and MAC are found in the cache, the tree walk may stop and logic flow 400 may proceed to block 408.

At block 408 "Auth MAC?" authentication of the MAC associated with the read request may be attempted. In various embodiments, the MAC may be authenticated with one or more domain specific keys. In some embodiments, once the line returns from protected memory 218, it may be authenticated by determining whether the MAC found in the cache matches a MAC computed, using a domain key, on the line returned from memory. For instance, one of domain key(s) 214 may be used to compute a MAC based on data line 330-1 and the computed MAC may be compared to MAC 328-1 located in encryption engine cache 208. If the data is not authenticated, a security exception may be triggered at bock 410. In various embodiments, the security exception may include one or more of a log entry, a notification, or a protective feature, such as quarantining the data. If the data is authenticated, then it may be decrypted at block 412. For example, encryption engine 104 may decrypt the data using a position dependent cipher. Once the data is decrypted it may be returned at block 414. For example, the data may be stored in internal memory 204, such as encryption engine cache 208.

Referring back to block 406 "CHit?", if the version and the MAC are not located in a cache memory a version access may be signaled and one or more next level nodes of the metadata tree may be read at block 416 "Read L0". In various embodiments, reading the next level the metadata tree may include reading one or more of branch nodes 220 and/or root nodes 206. For instance, metadata node 306-2 may be read in response to version 318-1 and/or MAC 328-1 not being identified in encryption engine cache memory 208.

Continuing to block 418 "CHit?", the cache memory may be searched for the one or more next level nodes read at block 416. If the one or more next level nodes are identified in cache memory, logic flow 400 may proceed to block 436 "Auth Ver?". At block 436 the version may be authenticated based on an embedded MAC and a metadata key. For example, version 318-1 may be authenticated based on embedded MAC 320 and metadata key 212. If the version is authenticated, logic flow 400 may proceed to block 408 and continue as described above.

Referring back to block 418, if the one or more next level nodes read at block 416 are not identified in cache memory, the logic flow 400 may proceed to block 420 "Read L1". At block 420 another access may be signaled and the next level of the metadata tree may be read. For instance, metadata node 306-1 may be read in response to metadata node 306-2 not being identified in encryption engine cache memory 208. In various embodiments, logic flow 400 may proceed as described until a next level node can be located in cache memory. In various such embodiments, a root node or secure counter may be read and identified in cache memory. Once a next level node is identified in cache memory (e.g., secure counter 304-1), each lower level node (e.g., metadata nodes 306-1, 306-2 and version node 316) may be authenticated in turn using associated embedded MACs down to the version (e.g., version 318-1) at block 436. If any level is not authenticated, a security exception may be triggered at block 410. In some embodiments, this may provide integrity and replay protection for the data associated with the read request.

Figure 5:
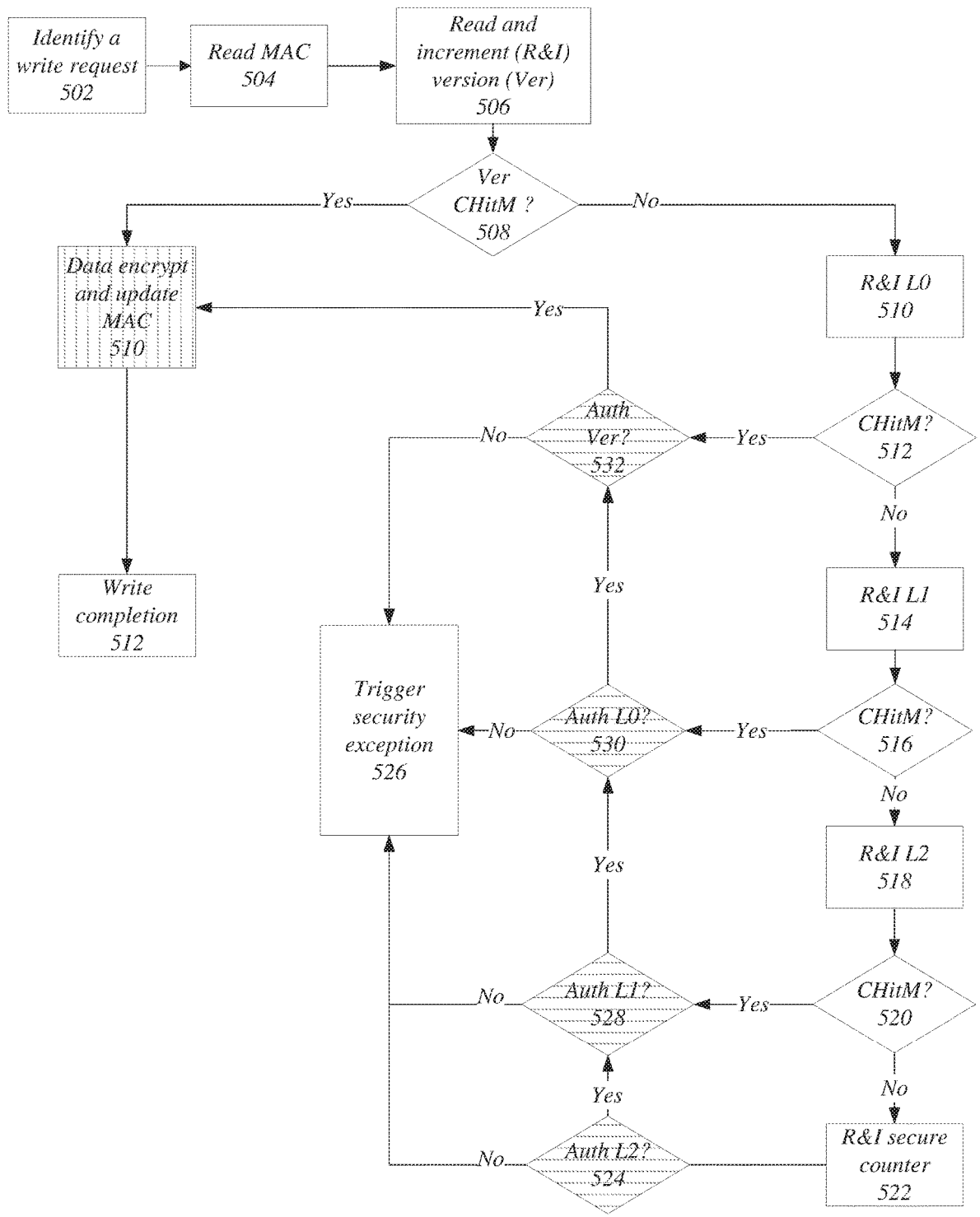
FIG. 5 illustrates an embodiment of a second logic flow.

FIG. 5 illustrates one embodiment of a logic flow 500, which may be representative of operations that may be executed in various embodiments in conjunction with a tree walk for a write request. The logic flow 500 may be representative of some or all of the operations that may be executed by one or more components of operating environments 100, 200A, 300 of FIGS. 1-3, such as multi-domain encryption system 102 or encryption engine 104. In the illustrated embodiment, vertical lines in a block indicate an operation performed using a domain key and horizontal lines in a block indicate an operation performed using a metadata key. The embodiments are not limited in this context.

In the illustrated embodiment shown in FIG. 5, the logic flow 500 may begin at block 502. At block 502 "identify a write request" a memory write request may be identified. For example, the memory write request may identify data within internal memory 204 to be written to protected memory 218, such as in one or more of protected data lines 222. Continuing to block 504 "read MAC" the MAC associated with the memory write request may be determined based on the write request. For example, the MAC may be determined to be 328-1. Proceeding to block 506 "read and increment (R&I) version (ver)", the version associated with the memory write request may be determined based on the write request and incremented. For example, the version may be determined to be 318-1 and version 318-1 may be incremented.

At block 508, "Ver CHitM?" it may be determined whether or not the version is located in a cache memory in a modified state. For example, internal memory 204 may include one or more cache memories, such as encryption engine cache 208, that are searched for a match to the version. If the version is found in the cache in a modified state, the tree walk may stop and logic flow 500 may proceed to block 510. At block 510 "data encrypt and update MAC" the data associated with the write request may be encrypted and the MAC may be updated. For example, the data may be encrypted using a position dependent cipher and an updated MAC may be determined based on the newly encrypted data. In some embodiments, the data may be encrypted and the MAC may be updated using a domain key. Proceeding to block 512, the encrypted data and the updated MAC may be written to a data line in protected memory 218, such as data line 330-1. In various embodiments, the updated MAC may be stored in metadata tree 302 as MAC 328-1.

Referring back to block 508 "Ver CHitM?", if the version is not located in a cache memory in a modified state, the next level of nodes in the metadata tree may be read and incremented at block 510 "R&I L0". For instance, metadata node 306-2 of metadata tree 302 may be read and counter node 312-n may be incremented in response to version 318-1 not being identified in internal memory 204, such as encryption engine cache memory 208. In various embodiments, reading the next level the metadata tree may include reading one or more of branch nodes 220 and/or root nodes 206. For instance, metadata node 306-2 may be read in response to version 318-1 not being identified in encryption engine cache memory 208 in a modified state.

Continuing to block 512 "CHitM?", the cache memory may be searched for the one or more next level nodes read at block 510 in a modified state. If the one or more next level nodes are identified in cache memory, logic flow 500 may proceed to block 532 "Auth Ver?". At block 532 the version may be authenticated based on an embedded MAC and a metadata key. For example, version 318-1 may be authenticated based on embedded MAC 320 and metadata key 212. If the version is authenticated, logic flow 500 may proceed to block 510 and continue as described above.

Referring back to block 512 "CHitM?", if the one or more next level nodes read at block 510 not located in cache memory in a modified state, the next level of the metadata tree may be read and incremented at block 514 "R&I L1". For instance, metadata node 306-1 may be read and counter 308-2 may be incremented in response to metadata node 306-2 not being identified in encryption engine cache memory 208. In various embodiments, logic flow 500 may proceed as described until a next level node can be located in cache memory. In various such embodiments, a root node or secure counter may be read and identified in cache memory. Once a next level node is located in cache memory in a modified state (e.g., secure counter 304-1), each lower level node (e.g., metadata nodes 306-1, 306-2 and version node 316) may be authenticated in turn using associated embedded MACs down to the version (e.g., version 318-1) at block 532. If any level is not authenticated, a security exception may be triggered at block 526. In some embodiments, this may provide integrity and replay protection for the data associated with the write request.

Figure 6:
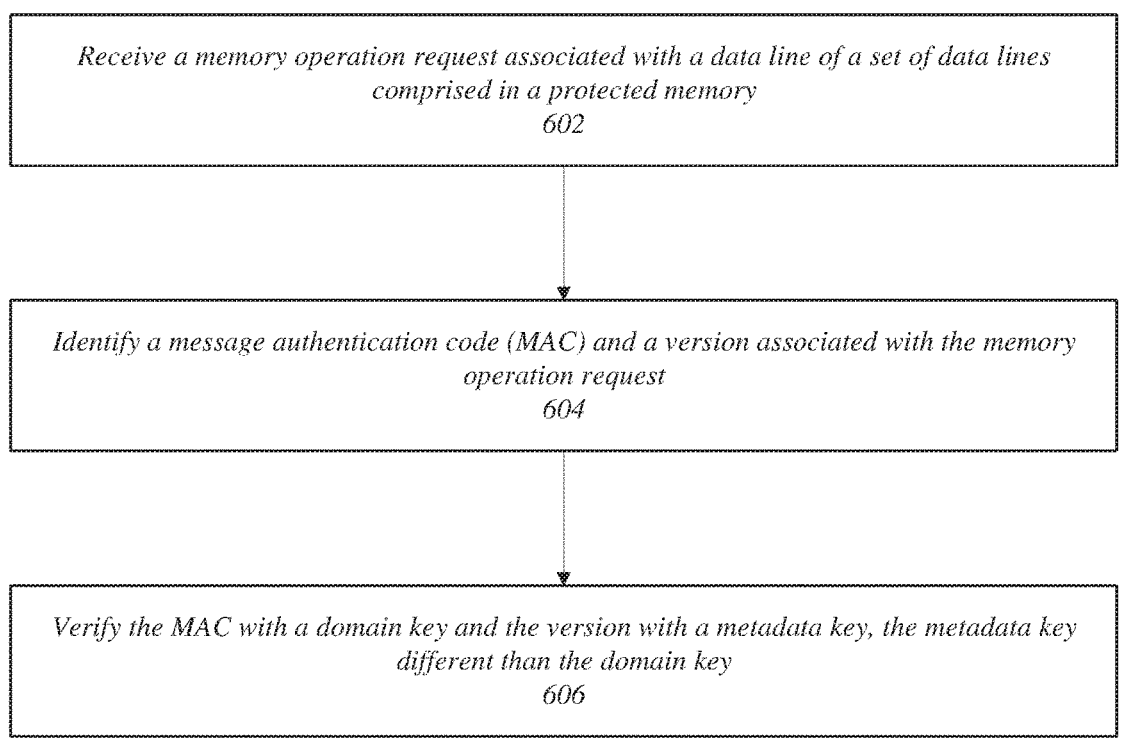
FIG. 6 illustrates an embodiment of a third logic flow.

FIG. 6 illustrates one embodiment of a logic flow 600, which may be representative of operations that may be executed in various embodiments in conjunctions with translating between one or more cipher systems. The logic flow 600 may be representative of some or all of the operations that may be executed by one or more components of operating environments 100, 200A, 300 of FIGS. 1-3, such as encryption engine 104. The embodiments are not limited in this context.

In the illustrated embodiment shown in FIG. 6, the logic flow 600 may begin at block 602. At block 602 "receive a memory operation request associated with a data line in a set of data lines comprised in a protected memory" a memory operation request associated with a data line in a set of data lines comprised in a protected memory may be received. For example, a memory operation request associated with data line 330-1 of protected data lines 222 located in protected memory 218 may be received. In some embodiments, the memory operation request may include a read request from protected memory 218 to internal memory 204. In other embodiments, the memory operation request may include a write request from internal memory 204 to protected memory 218.

Proceeding to block 604 "identify a message authentication code (MAC) and a version associated with the memory operation request", a MAC and version associated with the memory operation request may be identified. For example, encryption engine 202 may identify MAC 328-1 and version 318-1 based on the memory operation request. In some embodiments, the MAC and version may be identified based on one or more of the memory operation request, a data line indicated by the memory operation request, or the contents of the data line indicated by the memory operation request. Continuing to block 606 "verify the MAC with a domain key and the version with a metadata key, the metadata key different than the domain key" the version may be verified with a metadata key and the MAC may be verified with a domain key that is different than the metadata key. For example, encryption engine 202 may verify MAC 328-1 using one of the domain key(s) 214 and version 318-1 may be verified using metadata key 212. In some embodiments, the version may be verified using metadata key 212 and embedded MAC 320.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to communication flow 200A of FIG. 2 and logic flows 400, 500, and 600 of FIGS. 4-6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
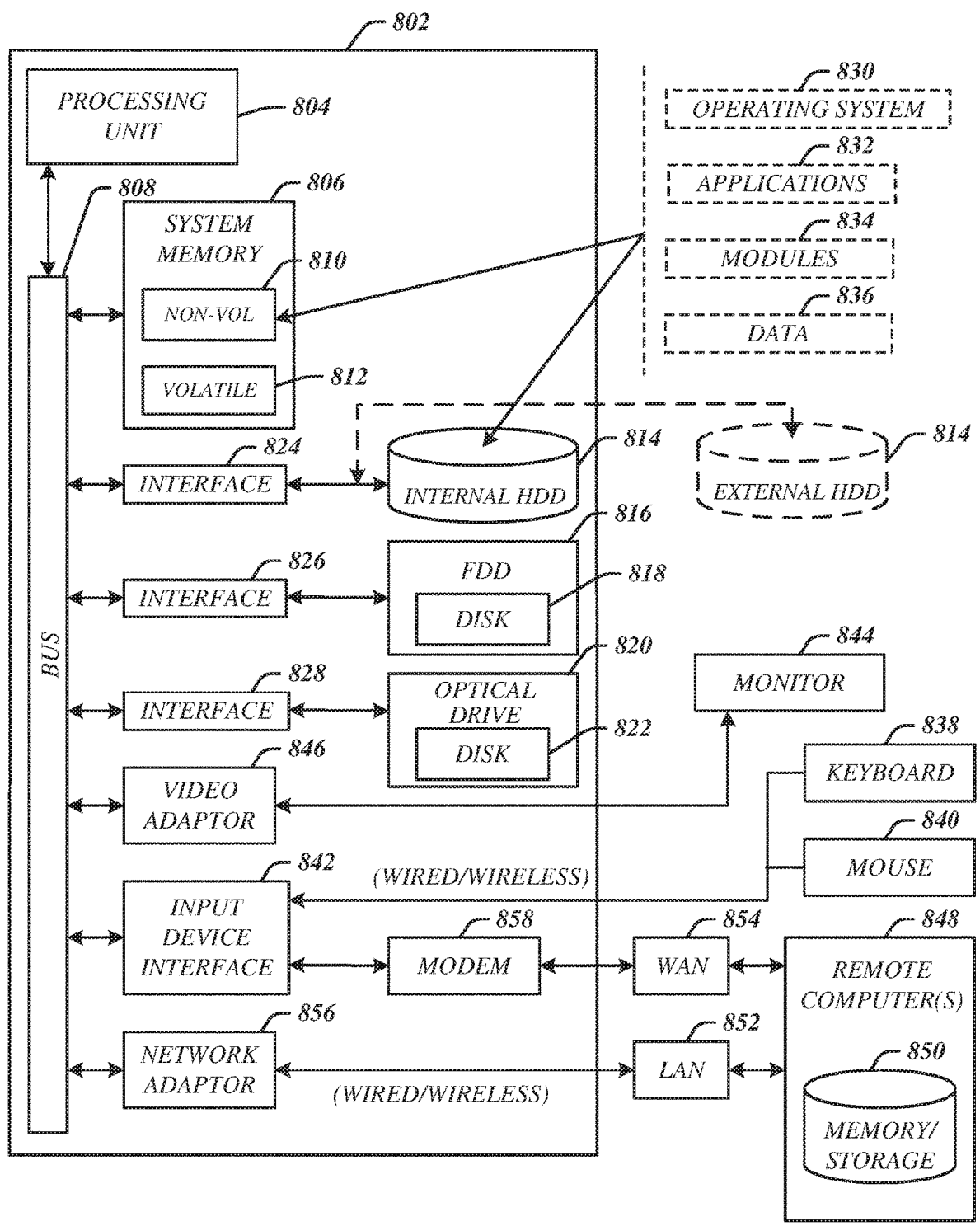
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a computer system that implements one or more components of operating environment 100 of FIG. 1 and/or operation environment 300 of FIG. 3. In some embodiments, computing architecture 800 may be representative, for example, one or more portions of encryption engine 104 that implement one or more embodiments described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the TEE 102, such as one or more portions of translation engine 104.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 1358, or is connected to a communications server on the WAN 1354, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
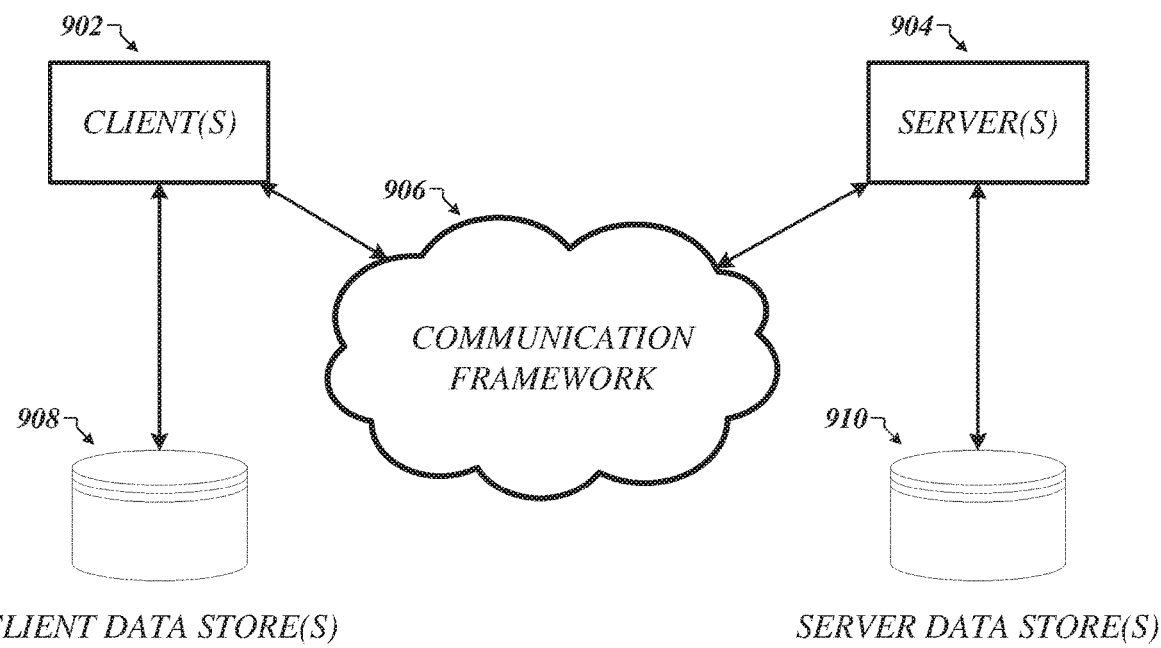
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus for cryptographic domain management, the apparatus comprising: a memory to store a metadata key; and logic for an encryption engine, at least a portion of the logic implemented in circuitry coupled to the memory, the logic to: receive a memory operation request associated with a data line of a set of data lines comprised in a protected memory, the protected memory separate from the memory; identify a message authentication code (MAC) and a version associated with the memory operation request;

and verify the MAC with a domain key and the version with the metadata key, the metadata key different than the domain key.

Example 2 includes the subject matter of Example 1, the memory comprising an internal memory within a trusted execution environment (TEE) and the protected memory external to the TEE, the logic for the encryption engine implemented in circuitry coupled to the internal memory.

Example 3 includes the subject matter of Example 2, the metadata key stored in the internal memory.

Example 4 includes the subject matter of Example 1, the verification of the MAC based on data stored in the memory.

Example 5 includes the subject matter of Example 1, the logic to: identify a cryptographic domain of a plurality of cryptographic domains based on the memory operation request; and select the domain key based on the identified cryptographic domain.

Example 6 includes the subject matter of Example 1, the logic to verify the version associated with the memory operation request based on a metadata tree, the metadata tree comprising a hierarchy of nodes with a root node located at the top of the hierarchy and one or more branch nodes located below the root node in the hierarchy, each of the one or more branch nodes to include one or more values and an embedded MAC.

Example 7 includes the subject matter of Example 6, the logic to increment a value in one or more nodes of the metadata tree in response to the memory operation request.

Example 8 includes the subject matter of Example 6, the logic to load one or more nodes of the metadata tree into the memory in response to the memory operation request.

Example 9 includes the subject matter of Example 6, the root node stored in the memory and the one or more branch nodes stored in the protected memory.

Example 10 includes the subject matter of Example 6, a respective embedded MAC included in a respective branch node generated based on the metadata key, the one or more values in the respective branch node, and a value in a node directly above the respective branch node.

Example 11 includes the subject matter of Example 10, the one or more values in the respective branch node comprising one or more counter values and the value in the node directly above the respective branch node comprising a counter value.

Example 12 includes the subject matter of Example 6, the one or more branch nodes comprising a version node and one or more intermediate nodes, the version node located at the bottom of the hierarchy and the one or more intermediate nodes located between the root node and the version node.

Example 13 includes the subject matter of Example 12, the version node comprising a counter value for each data line of the set of data lines stored in the protected memory.

Example 14 includes the subject matter of Example 13, a respective embedded MAC associated with the version node generated based on the metadata key and the counter value for each data line of the set of data lines stored in the protected memory.

Example 15 includes the subject matter of Example 1, the logic to attempt to identify a match of the MAC and the version in a cache of the encryption engine, the cache within the memory.

Example 16 includes the subject matter of Example 15, the logic to load one or more branch nodes into the cache when a match for the version is not identified in the cache.

Example 17 includes the subject matter of Example 15, the logic to encrypt or decrypt the data line with a second domain key when a match for the version is identified in the cache.

Example 18 includes the subject matter of Example 1, the encryption engine located in a trusted execution environment (TEE).

Example 19 includes the subject matter of Example 1, the domain key and the metadata key stored in the memory.

Example 20 is a system for cryptographic domain management, the system comprising: a protected memory to store a set of data lines, the set of data lines including a first subset of data lines associated with a first cryptographic domain and a second subset of data lines associated with a second cryptographic domain; an internal memory to store a metadata key, a first domain key associated with the first cryptographic domain, and a second domain key associated with the second cryptographic domain, the internal memory separate from the protected memory; and logic for an encryption engine, at least a portion of the logic implemented in circuitry coupled to the internal memory, the logic to: receive a memory operation request associated with a data line in the first subset of data lines of the set of data lines comprised in the protected memory; identify a message authentication code (MAC) and a version associated with the memory operation request; and verify the MAC with the first domain key and the version with the metadata key.

Example 21 includes the subject matter of Example 20, the internal memory within a trusted execution environment (TEE) and the protected memory external to the TEE.

Example 22 includes the subject matter of Example 20, the verification of the MAC based on data stored in the protected memory and the internal memory.

Example 23 includes the subject matter of Example 20, the logic to: identify the first cryptographic domain based on the memory operation request; and select the first domain key based on identification of the first cryptographic domain.

Example 24 includes the subject matter of Example 20, the logic to verify the version associated with the memory operation request based on a metadata tree, the metadata tree comprising a hierarchy of nodes with a root node located at the top of the hierarchy and one or more branch nodes located below the root node in the hierarchy, each of the one or more branch nodes to include one or more values and an embedded MAC.

Example 25 includes the subject matter of Example 24, the logic to increment a value in one or more nodes of the metadata tree in response to the memory operation request.

Example 26 includes the subject matter of Example 24, the logic to load one or more nodes of the metadata tree into the internal memory in response to the memory operation request.

Example 27 includes the subject matter of Example 24, the root node stored in the internal memory and the one or more branch nodes stored in the protected memory.

Example 28 includes the subject matter of Example 24, a respective embedded MAC included in a respective branch node generated based on the metadata key, the one or more values in the respective branch node, and a value in a node directly above the respective branch node.

Example 29 includes the subject matter of Example 28, the one or more values in the respective branch node comprising one or more counter values and the value in the node directly above the respective branch node comprising a counter value.

Example 30 includes the subject matter of Example 24, the one or more branch nodes comprising a version node and one or more intermediate nodes, the version node located at the bottom of the hierarchy and the one or more intermediate nodes located between the root node and the version node.

Example 31 includes the subject matter of Example 30, the version node comprising a counter value for each data line of the set of data lines stored in the protected memory.

Example 32 includes the subject matter of Example 31, a respective embedded MAC associated with the version node generated based on the metadata key and the counter value for each data line of the set of data lines stored in the protected memory.

Example 33 includes the subject matter of Example 20, the logic to attempt to identify a match of the MAC and the version in a cache of the encryption engine, the cache within the internal memory.

Example 34 includes the subject matter of Example 33, the logic to load one or more branch nodes into the cache when a match for the version is not identified in the cache.

Example 35 includes the subject matter of Example 33, the logic to encrypt or decrypt the data line with a third domain key associated with the first cryptographic domain when a match for the version is identified in the cache.

Example 36 includes the subject matter of Example 20, the encryption engine located in a trusted execution environment (TEE).

Example 37 is at least one non-transitory computer-readable medium comprising a set of instructions that, in response to being executed at an encryption device, cause the encryption device to: receive a memory operation request associated with a data line of a set of data lines comprised in a protected memory; identify a message authentication code (MAC) and a version associated with the memory operation request; and verify the MAC with a domain key and the version with the metadata key, the metadata key different than the domain key, and the metadata key stored in a memory separate from the protected memory.

Example 38 includes the subject matter of Example 37, the memory comprising an internal memory within a trusted execution environment (TEE) and the protected memory external to the TEE.

Example 39 includes the subject matter of Example 38, the metadata key stored in the internal memory.

Example 40 includes the subject matter of Example 37, the verification of the MAC based on data stored in the memory.

Example 41 includes the subject matter of Example 37, comprising instructions that, in response to being executed at the encryption device, cause the encryption device to: identify a cryptographic domain of a plurality of cryptographic domains based on the memory operation request; and select the domain key based on the identified cryptographic domain.

Example 42 includes the subject matter of Example 37, comprising instructions that, in response to being executed at the encryption device, cause the encryption device to verify the version associated with the memory operation request based on a metadata tree, the metadata tree comprising a hierarchy of nodes with a root node located at the top of the hierarchy and one or more branch nodes located below the root node in the hierarchy, each of the one or more branch nodes to include one or more values and an embedded MAC.

Example 43 includes the subject matter of Example 42, comprising instructions that, in response to being executed at the encryption device, cause the encryption device to increment a value in one or more nodes of the metadata tree in response to the memory operation request.

Example 44 includes the subject matter of Example 42, comprising instructions that, in response to being executed at the encryption device, cause the encryption device to load one or more nodes of the metadata tree into the memory in response to the memory operation request.

Example 45 includes the subject matter of Example 42, the root node stored in the memory and the one or more branch nodes stored in the protected memory.

Example 46 includes the subject matter of Example 42, a respective embedded MAC included in a respective branch node generated based on the metadata key, the one or more values in the respective branch node, and a value in a node directly above the respective branch node.

Example 47 includes the subject matter of Example 46, the one or more values in the respective branch node comprising one or more counter values and the value in the node directly above the respective branch node comprising a counter value.

Example 48 includes the subject matter of Example 42, the one or more branch nodes comprising a version node and one or more intermediate nodes, the version node located at the bottom of the hierarchy and the one or more intermediate nodes located between the root node and the version node.

Example 49 includes the subject matter of Example 48, the version node comprising a counter value for each data line of the set of data lines stored in the protected memory.

Example 50 includes the subject matter of Example 49, a respective embedded MAC associated with the version node generated based on the metadata key and the counter value for each data line of the set of data lines stored in the protected memory.

Example 51 includes the subject matter of Example 37, comprising instructions that, in response to being executed at the encryption device, cause the encryption device to attempt to identify a match of the MAC and the version in a cache within the memory.

Example 52 includes the subject matter of Example 51, comprising instructions that, in response to being executed at the encryption device, cause the encryption device to load one or more branch nodes into the cache when a match for the version is not identified in the cache.

Example 53 includes the subject matter of Example 51, comprising instructions that, in response to being executed at the encryption device, cause the encryption device to encrypt or decrypt the data line with a second domain key when a match for the version is identified in the cache.

Example 54 includes the subject matter of Example 37, the memory located in a trusted execution environment (TEE).

Example 55 includes the subject matter of Example 37, the domain key and the metadata key stored in the memory.

Example 56 is a method for cryptographic domain management, the method comprising: receiving a memory operation request associated with a data line of a set of data lines comprised in a protected memory; identifying a message authentication code (MAC) and a version associated with the memory operation request; and verifying the MAC with a domain key and the version with the metadata key, the metadata key different than the domain key, and the metadata key stored in a memory.

Example 57 includes the subject matter of Example 56, the memory comprising an internal memory within a trusted execution environment (TEE) and the protected memory external to the TEE.

Example 58 includes the subject matter of Example 57, the metadata key stored in the internal memory.

Example 59 includes the subject matter of Example 56, the verification of the MAC based on data stored in the memory.

Example 60 includes the subject matter of Example 56, comprising: identifying a cryptographic domain of a plurality of cryptographic domains based on the memory operation request; and selecting the domain key based on the identified cryptographic domain.

Example 61 includes the subject matter of Example 56, comprising verifying the version associated with the memory operation request based on a metadata tree, the metadata tree comprising a hierarchy of nodes with a root node located at the top of the hierarchy and one or more branch nodes located below the root node in the hierarchy, each of the one or more branch nodes to include one or more values and an embedded MAC.

Example 62 includes the subject matter of Example 61, comprising incrementing a value in one or more nodes of the metadata tree in response to the memory operation request.

Example 63 includes the subject matter of Example 61, comprising loading one or more nodes of the metadata tree into the memory in response to the memory operation request.

Example 64 includes the subject matter of Example 61, the root node stored in the memory and the one or more branch nodes stored in the protected memory.

Example 65 includes the subject matter of Example 61, a respective embedded MAC included in a respective branch node generated based on the metadata key, the one or more values in the respective branch node, and a value in a node directly above the respective branch node.

Example 66 includes the subject matter of Example 65, the one or more values in the respective branch node comprising one or more counter values and the value in the node directly above the respective branch node comprising a counter value.

Example 67 includes the subject matter of Example 61, the one or more branch nodes comprising a version node and one or more intermediate nodes, the version node located at the bottom of the hierarchy and the one or more intermediate nodes located between the root node and the version node.

Example 68 includes the subject matter of Example 67, the version node comprising a counter value for each data line of the set of data lines stored in the protected memory.

Example 69 includes the subject matter of Example 68, a respective embedded MAC associated with the version node generated based on the metadata key and the counter value for each data line of the set of data lines stored in the protected memory.

Example 70 includes the subject matter of Example 56, comprising attempting to identify a match of the MAC and the version in a cache within the memory.

Example 71 includes the subject matter of Example 70, comprising loading one or more branch nodes into the cache when a match for the version is not identified in the cache.

Example 72 includes the subject matter of Example 70, comprising encrypting or decrypting the data line with a second domain key when a match for the version is identified in the cache.

Example 73 includes the subject matter of Example 56, the memory located in a trusted execution environment (TEE).

Example 74 includes the subject matter of Example 56, the domain key and the metadata key stored in the memory.

Example 75 is an apparatus for cryptographic domain management, the apparatus comprising: means for receiving a memory operation request associated with a data line of a set of data lines comprised in a protected memory; means for identifying a message authentication code (MAC) and a version associated with the memory operation request; and means for verifying the MAC with a domain key and the version with the metadata key, the metadata key different than the domain key, and the metadata key stored in a memory separate from the protected memory.

Example 76 includes the subject matter of Example 75, the memory comprising an internal memory within a trusted execution environment (TEE) and the protected memory external to the TEE, the logic for the encryption engine implemented in circuitry coupled to the internal memory.

Example 77 includes the subject matter of Example 76, the metadata key stored in the internal memory.

Example 78 includes the subject matter of Example 75, the verification of the MAC based on data stored in the memory.

Example 79 includes the subject matter of Example 75, comprising: means for identifying a cryptographic domain of a plurality of cryptographic domains based on the memory operation request; and means for selecting the domain key based on the identified cryptographic domain.

Example 80 includes the subject matter of Example 75, comprising means for verifying the version associated with the memory operation request based on a metadata tree, the metadata tree comprising a hierarchy of nodes with a root node located at the top of the hierarchy and one or more branch nodes located below the root node in the hierarchy, each of the one or more branch nodes to include one or more values and an embedded MAC.

Example 81 includes the subject matter of Example 80, comprising means for incrementing a value in one or more nodes of the metadata tree in response to the memory operation request.

Example 82 includes the subject matter of Example 80, comprising means for loading one or more nodes of the metadata tree into the memory in response to the memory operation request.

Example 83 includes the subject matter of Example 80, the root node stored in the memory and the one or more branch nodes stored in the protected memory.

Example 84 includes the subject matter of Example 80, a respective embedded MAC included in a respective branch node generated based on the metadata key, the one or more values in the respective branch node, and a value in a node directly above the respective branch node.

Example 85 includes the subject matter of Example 84, the one or more values in the respective branch node comprising one or more counter values and the value in the node directly above the respective branch node comprising a counter value.

Example 86 includes the subject matter of Example 80, the one or more branch nodes comprising a version node and one or more intermediate nodes, the version node located at the bottom of the hierarchy and the one or more intermediate nodes located between the root node and the version node.

Example 87 includes the subject matter of Example 86, the version node comprising a counter value for each data line of the set of data lines stored in the protected memory.

Example 88 includes the subject matter of Example 87, a respective embedded MAC associated with the version node generated based on the metadata key and the counter value for each data line of the set of data lines stored in the protected memory.

Example 89 includes the subject matter of Example 75, comprising means for attempting to identify a match of the MAC and the version in a cache of the encryption engine, the cache within the memory.

Example 90 includes the subject matter of Example 89, comprising means for loading one or more branch nodes into the cache when a match for the version is not identified in the cache.

Example 91 includes the subject matter of Example 89, comprising means for encrypting or means for decrypting the data line with a second domain key when a match for the version is identified in the cache.

Example 92 includes the subject matter of Example 75, the domain key and the metadata key stored in the memory.

Example 93 includes the subject matter of Example 1, the memory operation request comprising a set of physical address bits, the set of physical address bits to include a subset of bits to identify the domain key out of a plurality of domain keys.

Example 94 includes the subject matter of Example 1, the domain key encrypted and stored in the protected memory.

Example 95 includes the subject matter of Example 94, the logic to decrypt the domain key before the MAC can be verified with the domain key.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
   circuitry; and
   memory coupled to the circuitry, the memory comprising a plurality of domain keys and instructions, the instructions when executed by the circuitry cause the circuitry to:
     receive a memory operation request associated with a data line of a plurality of data lines comprised in a protected memory;
     identify a first cryptographic domain of a plurality of cryptographic domains based on the memory operation, the first cryptographic domain associated with a first one of the plurality of domain keys; and
     utilize a non-temporal move on the data line with a second domain key of the plurality of domain keys to change association of the data line from the first cryptographic domain to a second cryptographic domain, the second cryptographic domain associated with the second one of the plurality of domain keys.

2. The apparatus of claim 1, comprising the protected memory.

3. The apparatus of claim 2, comprising a trusted execution environment (TEE), the TEE comprising the circuitry and the memory, the protected memory external to the TEE.

4. The apparatus of claim 1, the protected memory comprising at least a portion of a metadata tree, the instructions when executed by the circuitry cause the circuitry to:
   identify a first message authentication code (MAC) associated with the data line;
   generate a second MAC based on the data line and the first domain key;
   determine whether the second MAC matches the first MAC based on a comparison of the first MAC to the second MAC; and
   decrypt the data line based on a determination that the second MAC matches the first MAC.

5. The apparatus of claim 4, the metadata tree comprising a plurality of nodes, the instructions when executed by the circuitry cause the circuitry to load one or more nodes of the plurality of nodes into the memory in response to the memory operation request.

6. The apparatus of claim 4, the metadata tree comprising a plurality of branch nodes, each of the plurality of branch nodes to include a counter value, the instructions when executed by the circuitry cause the circuitry to:
   identify a branch node of the plurality of branch nodes associated with the first cryptographic domain; and
   generate the second MAC based on the first domain key and the counter value of the identified branch node.

7. The apparatus of claim 6, the instructions when executed by the circuitry cause the circuitry to increment the counter value in one or more of the plurality of branch nodes in response to the memory operation request.

8. The apparatus of claim 6, each of the plurality of branch nodes to include an embedded MAC, the instructions when executed by the circuitry cause the circuitry to identify the first MAC associated with the data line as the embedded MAC of the branch node of the plurality of branch nodes associated with the first cryptographic domain.

9. A non-transitory computer-readable medium comprising instructions that, in response to being executed by circuitry in a trusted execution environment (TEE) comprising the circuitry and memory comprising a plurality of domain keys, cause the circuitry to:
   receive a memory operation request associated with a data line of a plurality of data lines comprised in a protected memory;
   identify a first cryptographic domain of a plurality of cryptographic domains based on the memory operation, the first cryptographic domain associated with a first one of the plurality of domain keys; and
   utilize a non-temporal move on the data line with a second domain key of the plurality of domain keys to change association of the data line from the first cryptographic domain to a second cryptographic domain, the second cryptographic domain associated with the second one of the plurality of domain keys.

10. The non-transitory computer-readable medium of claim 9, the protected memory external to the TEE.

11. The non-transitory computer-readable medium of claim 9, the protected memory comprising at least a portion of a metadata tree, the instructions when executed by the circuitry cause the circuitry to:
   identify a first message authentication code (MAC) associated with the data line;
   generate a second MAC based on the data line and the first domain key;
   determine whether the second MAC matches the first MAC based on a comparison of the first MAC to the second MAC; and
   decrypt the data line based on a determination that the second MAC matches the first MAC.

12. The non-transitory computer-readable medium of claim 11, the metadata tree comprising a plurality of nodes, the instructions when executed by the circuitry cause the circuitry to load one or more nodes of the plurality of nodes into the memory in response to the memory operation request.

13. The non-transitory computer-readable medium of claim 11, the metadata tree comprising a plurality of branch nodes, each of the plurality of branch nodes to include a counter value, the instructions when executed by the circuitry cause the circuitry to:
identify a branch node of the plurality of branch nodes associated with the first cryptographic domain; and
generate the second MAC based on the first domain key and the counter value of the identified branch node.

14. The non-transitory computer-readable medium of claim 13, the instructions when executed by the circuitry cause the circuitry to increment the counter value in one or more of the plurality of branch nodes in response to the memory operation request.

15. The non-transitory computer-readable medium of claim 13, each of the plurality of branch nodes to include an embedded MAC, the instructions when executed by the circuitry cause the circuitry to identify the first MAC associated with the data line as the embedded MAC of the branch node of the plurality of branch nodes associated with the first cryptographic domain.

16. A method, comprising:
receiving, at circuitry of a trusted execution environment (TEE), a memory operation request associated with a data line of a plurality of data lines comprised in a protected memory;
identifying a first cryptographic domain of a plurality of cryptographic domains based on the memory operation, the first cryptographic domain associated with a first one of a plurality of domain keys stored in a memory of the TEE; and
utilizing a non-temporal move on the data line with a second domain key of the plurality of domain keys to change association of the data line from the first cryptographic domain to a second cryptographic domain, the second cryptographic domain associated with the second one of the plurality of domain keys.

17. The method of claim 16, the protected memory external to the TEE.

18. The method of claim 16, the protected memory comprising at least a portion of a metadata tree, the method comprising:
identifying a first message authentication code (MAC) associated with the data line;
generating a second MAC based on the data line and the first domain key;
determining whether the second MAC matches the first MAC based on a comparison of the first MAC to the second MAC; and
decrypting the data line based on a determination that the second MAC matches the first MAC.

19. The method of claim 18, the metadata tree comprising a plurality of nodes, the method comprising loading one or more nodes of the plurality of nodes into the memory in response to the memory operation request.

20. The method of claim 18, the metadata tree comprising a plurality of branch nodes, each of the plurality of branch nodes to include a counter value, the method comprising:
identifying a branch node of the plurality of branch nodes associated with the first cryptographic domain; and
generating the second MAC based on the first domain key and the counter value of the identified branch node.

21. The method of claim 20, comprising incrementing the counter value in one or more of the plurality of branch nodes in response to the memory operation request.

22. The method of claim 20, each of the plurality of branch nodes to include an embedded MAC, the method comprising identifying the first MAC associated with the data line as the embedded MAC of the branch node of the plurality of branch nodes associated with the first cryptographic domain.

* * * * *